(12) United States Patent
De Koning (10) Patent No.: US 8,347,550 B2
(45) Date of Patent: Jan. 8, 2013

(54) GREENHOUSE, SCREEN DEVICE AND SCREEN

(75) Inventor: Rene Cornelis Johannes De Koning, 'S-Gravenzande (NL)

(73) Assignee: Peter Dekker Installaties B.V., Naaldwijk (NL)

( * ) Notice: Subject to any disclaimer, the term of this patent is extended or adjusted under 35 U.S.C. 154(b) by 460 days.

(21) Appl. No.: 12/740,905

(22) PCT Filed: Oct. 22, 2008

(86) PCT No.: PCT/NL2008/000236
§ 371 (c)(1),
(2), (4) Date: Apr. 30, 2010

(87) PCT Pub. No.: WO2009/057999
PCT Pub. Date: May 7, 2009

(65) Prior Publication Data
US 2010/0263272 A1      Oct. 21, 2010

(30) Foreign Application Priority Data
Oct. 30, 2007   (NL) ..................................... 1034598

(51) Int. Cl.
*A01G 9/22*     (2006.01)
(52) U.S. Cl. ........................................................... 47/17
(58) Field of Classification Search .................... 29/448; 47/17, 20.1, 22.1, 29.5, 31, 32.3; 160/378
See application file for complete search history.

(56) References Cited

U.S. PATENT DOCUMENTS

| 4,697,326 A | * | 10/1987 | Faircloth | ........................ | 29/448 |
| 2003/0061784 A1 | * | 4/2003 | van der Drift et al. | ....... | 52/786.1 |
| 2010/0263272 A1 | * | 10/2010 | De Koning | ........................ | 47/17 |

FOREIGN PATENT DOCUMENTS

| NL | 8105447 | | 7/1983 |
| NL | 1011546 | * | 9/2000 |
| NL | 1014244 | * | 8/2001 |

OTHER PUBLICATIONS

International Search Report of PCT/NL2008/000236 mailed Mar. 17, 2009.
Written Opinion of PCT/NL2008/000236 mailed Jun. 26, 2008.

* cited by examiner

*Primary Examiner* — Frank T Palo
(74) *Attorney, Agent, or Firm* — Rankin Hill & Clark LLP (57) ABSTRACT

The present invention comprises greenhouse comprising a frame provided with columns and with parallel, equally spaced girders supported by said columns, as well as a roof supported by said columns and with at least one wall, said greenhouse comprising a screen device along the roof, which screen device comprises a number of screens, a screen (1) being connected, via first connecting means, to a girder on a first longitudinal side and being connected, via second connecting means, to a front bar (2) extending parallel to the girders on a second longitudinal side opposite said first longitudinal side, which front bar is movable in a direction transversely to its longitudinal direction between an open position and a closed position, said second connecting means comprising a lace element (3) connected to the screen near a longitudinal edge of the screen and a lace chamber (4) associated with the front bar, which lace chamber extends parallel to the longitudinal direction of the front bar, in which lace element is retained, which lace chamber has a passage extending parallel to the front bar for inserting the lace element into the lace chamber from an end face of the front bar, through which passage the screen extends in use, which lace element is strip-shaped.

26 Claims, 12 Drawing Sheets

GREENHOUSE, SCREEN DEVICE AND SCREEN

The present invention relates to a greenhouse comprising a frame provided with columns and with parallel, equally spaced girders supported by said columns, as well as a roof supported by said columns and with at least one wall, said greenhouse comprising a screen device along the roof and/or along a wall, which screen device comprises at least one screen which is connected, via first connecting means, to a girder on a first longitudinal side, and which is connected, via second connecting means, to a front bar extending parallel to the girders on a second longitudinal side opposite said first longitudinal side, which front bar is movable in a direction transversely to its longitudinal direction between an open position and a closed position, said second connecting means comprising a lace element connected to the screen near a longitudinal edge of the screen and a lace chamber associated with the front bar, which lace chamber extends parallel to the longitudinal direction of the front bar, in which lace chamber the lace element is retained, which lace chamber has a passage extending parallel to the front bar for inserting the lace element into the lace chamber from an end face of the front bar, through which passage the screen extends in use.

In greenhouses use is frequently made of screen devices which comprise a number of horizontal, vertical or sloping screens to be opened and closed along the roof or along a wall. Such screens can perform various functions, such as keeping out the sun, blacking out, saving energy, and generally function to optimise the climate inside the greenhouse. When used under a roof, the width of such screens is about the same as the spacing between adjacent girders of the greenhouse, whilst the screens are dozens if not hundreds of metres long. In the course of time, the functionality of the screens will decrease, for example due to soiling and wear. As greenhouses become larger, and also higher, it has appeared to be more and more difficult to replace screens so as to retain their functionality. When the replacement of screens is postponed too long, this will have an adverse effect on the efficiency with which a greenhouse can be operated.

To facilitate the replacement of screens, Peter Decker Installaties offer a screen device under the name "Slipp-in", which comprises lace elements of circular cross-section on two opposite longitudinal sides of the screen, which lace elements are retained in correspondingly shaped lace chambers in (or near) a girder and in (or near) a front bar, respectively. The greenhouse as referred to in the introduction relates to a greenhouse provided with such a screen device. The lace elements form part of a longitudinal strip which is separately stitched to the screen, of which longitudinal strip the round, strip-shaped lace element in question forms part. Incorporating the round lace directly into the screen itself has been found to be very difficult, so that it appeared to be necessary to stitch the aforesaid longitudinal strip to the screen. Partially because of this, the screens are comparatively expensive, thus creating an economic threshold for actually replacing a screen in a greenhouse. Another drawback is the fact that the presence of the round lace element makes it more difficult to roll up the screen, in which connection it should be realised that, as already indicated before, the length of such screens may run up to as much as hundreds of metres. As the screen length increases, increasingly large tensions are set up in the screen while it is being rolled up, which may lead to damage to the screen.

The object of the present invention is to solve or at least alleviate the above problems, to which end the invention is in the first place characterised in that the lace element is strip-shaped. The intention is based on the inventive concept that strip-shaped lace elements, too, can be adequately retained in a lace chamber. Important advantages of strip-shaped lace elements in that regard are that a screen provided with such a strip-shaped lace element can be rolled up more easily, so that there will be no undesirable tensions in the screen, or at least only to a significantly reduced extent, in the rolled-up condition thereof. In addition, a strip-shaped lace element provides better possibilities of incorporating such a strip-shaped lace element in a screen in an inexpensive manner, so that the costs thereof can be low.

Incidentally, it is noted that NL 1011546 discloses a screen construction for a greenhouse in which the screen is provided with a lip on a longitudinal side thereof for connecting the screen to a section mounted in the greenhouse. Upon installation of the screen in the greenhouse, the lip is fixed in a recess in the section along its entire length by means of a snap connection. To install such a screen, it is thus necessary to snap the lip of the screen into the section along the entire length of the screen, which is generally mounted at a considerable height, which is a difficult and time-consuming job, in particular because of the fact that the work must be carried out at a great height. To remove the screen, the same procedure must be followed, pulling the lip out of the section by means of a thin tool for releasing the snap connection.

Furthermore, NL 1014244 discloses a screen device for a greenhouse in which the screen is fixed to a suitable section mounted in the greenhouse along the entire length thereof by means of separate wire clamps. The drawbacks involved in the installation or the removal of such a screen are analogous to the aforesaid drawbacks of the screen construction according to NL 1011546.

The lace chamber preferably has an at least substantially rectangular cross-section, so as to conform to the shape of the strip-shaped lace element.

A reliable operation of the second connecting means is in particular obtained if the transverse direction of the strip-shaped lace element includes an angle with the part of the screen that joins the lace element in the closed position of the front bar, in which connection it is preferable if the angle is smaller than or equal to 90 degrees, whilst furthermore preferably said angle ranges between 30 and 70 degrees.

It is very advantageous if the strip-shaped lace element has at least one flat or at any rate flattened longitudinal side, so that the respective flat or at any rate flattened longitudinal sides can abut against the inner sides of the lace chamber in the closed position of the front bar, i.e. in the stretched condition of the screen, so that the pressure is distributed over a certain area rather than over a line of contact. When the screen is being inserted or retracted, on the other hand, line contact may take place, which is advantageous because of the lower resistance that is encountered during said movement.

Within this framework it is furthermore preferable if the lace chamber has at least one flat or at any rate a flattened longitudinal side.

Abutment between the inner side of the lace chamber and part of the outer side of the strip-shaped lace element can in particular take place in a simple manner over a certain area if the strip-shaped lace element has an at least substantially diamond-shaped cross-section or if the strip-shaped lace element has an at least substantially Z-shaped cross-section.

An advantageous load on the screen is generally obtained if said passage is located in or at least near a corner of the cross-section of the lace chamber. To make it easier to insert and retract the screen, more specifically that part of the screen where the strip-shaped lace element is provided, it is preferable that the lace chamber forms part of an extruded first chamber section member made of plastic material, or that the lace chamber forms part of a rolled first chamber section member made of a metal. Very advantageous sliding properties, in particular of said plastic material, can be selected in that case.

Furthermore preferably, the first chamber section member is connected to the front bar via first further connecting means, which, even more preferably, are of the snap type, so that they are easy to fit.

The use of such first further connecting means has the advantage that the length of the first chamber section member can be (significantly) greater than the length of the parts of which the front bar is made up, so that there are no, or at any rate fewer, transitions/edges behind which the screen can hook upon retraction or extension thereof.

Within this framework it is preferable if the front bar is built up of a number of interconnected front bar parts positioned in line with each other, wherein the first chamber section member is made in one piece and the length of the first chamber section member is greater than the length of the individual front bar parts, in which connection it is very advantageous if the length of the first chamber section member corresponds to the length of the front bar.

As an alternative to the use of first further connecting means as suggested above for a number of preferred embodiments, it may also be very advantageous if the first chamber section member forms the front bar. This would imply, therefore, that the front bar is made of an extruded plastic material, or of a rolled (possibly in the greenhouse itself) metal.

The strip-shaped lace element preferably forms an integral part of the screen, in which case the lace element is integrated in the screen during the production of the screen, as a result of which the cost price of the screen can be significantly reduced, for example in comparison with the situation in which the strip-shaped lace element forms part of longitudinal strips that were stitched on at a later point in time.

It is in particular preferable if the strip-shaped lace element is woven or knitted into the screen, partially in dependence on the question whether the screen itself is of a woven type or of a knitted type.

In order to facilitate the integration of the strip-shaped lace element in the screen take place during the production of the screen as much as possible, assuming that the screen already comprises parallel, flexible foil parts extending in the longitudinal direction of the screen, the width of said foil parts is preferably at least substantially the same as the width of the strip-shaped lace element.

Especially if the parallel, flexible foil parts extending in the longitudinal direction of the screen are relatively narrow, for example less than 2 mm, it is preferable if the width of the foil parts is smaller than the width of the strip-shaped lace element. In this way it is nevertheless possible to obtain a sufficient width of the strip-shaped lace element so as to ensure an adequate retainment of the strip-shaped lace element in the lace chamber. In particular such a wide strip-shaped lace element, for example having a width of 10 mm, could be connected to the surface of the screen in question by welding, glueing or stitching. These production techniques and strip-shaped lace elements can also be used with sheet-like screens as used in vertical roll-up screens, for example, which are made of a foil-like material or, for example, of a laminated material.

It is advantageous if said flexible foil parts are provided only on one longitudinal side of the strip-shaped lace element, so that there will be no unnecessary material on a longitudinal side of the screen.

In general it is advantageous if the strip-shaped lace element extends at a distance of maximally 10 cm, furthermore preferably maximally 2 cm, from the longitudinal edge of the screen. It can be noted in that regard that it may be advantageous with a view to integrating the strip-shaped lace element in the screen if the screen is provided with flexible foil parts on two longitudinal sides of the strip-shaped lace element.

An adequate retainment of the strip-shaped lace element within the lace chamber can be obtained in particular if the proportion between the width and the thickness of the strip shape of the lace element is minimally three, furthermore preferably if said proportion is minimally five and/or if the width of the strip shape of the lace element is at least 3 mm. In generally it is desirable to use a greater width in proportion as the screen weight is greater.

The advantages of the present invention can be achieved not only on the side of the front bar, but also on the side of a girder, wherein the screen can be stretched between the girder in question and the front bar in question. Within this framework it is preferable if said first connecting means comprise a further strip-shaped lace element which is connected to the screen near a longitudinal edge of the screen, as well as a further lace chamber associated with the girder, which extends parallel to the longitudinal direction of the girder, in which further lace chamber said further strip-shaped lace element is retained, which further lace chamber has a further passage extending parallel to said girder for inserting said further strip-shaped lace element into said further lace chamber from an end face of the girder, through which further passage the screen extends in use, in particular if said strip-shaped lace element and said further strip-shaped lace element are identical in shape.

Said further lace chamber preferably forms part of an extruded second chamber section member made of plastic material or of a rolled second chamber section member made of metal.

The latter variant is usually preferable, in particular if, according to another preferred embodiment, the second chamber section member is connected to the girder via second further connecting means, for example snap-type connecting means, because of the corresponding coefficients of expansion between the material of the rolled second chamber section member and that of the girder, which is normally made of steel.

In the usual situation, in which the girder is built up of a number of interconnected girder parts positioned in line with each other, it is preferable if the second chamber section member is made in one piece and the length of the second chamber section member is greater than the length of the individual girder parts. In this way the number of transitions which the screen must pass upon being inserted or retracted can be significantly reduced, even to zero, if according to another preferred embodiment the length of the second chamber section member corresponds to the length of the girder.

To make it easier to insert the strip-shaped lace element into and retract out of the lace chamber, it is preferable if the height of the passage is greater than the thickness of the strip-shaped lace element.

Although the invention has been explained in the foregoing in relation to the situation in which in any case a strip-shaped lace element is used on the side of the front bar, it is also conceivable within the framework of the present invention if a strip-shaped lace element is used (only) on the side of a girder, although it is most preferred to use a strip-shaped lace element both on the side of the front bar and on the side of a girder. Within the aforesaid framework, the present invention also relates to a greenhouse comprising a frame provided with columns and with parallel, equally spaced girders supported by said columns, as well as a roof supported by said columns and with at least one wall, said greenhouse comprising a screen device along the roof and/or along a wall, which screen device comprises at least one screen which is connected, via first connecting means, to a girder on a first longitudinal side, and which is connected, via second connecting means, to a front bar extending parallel to the girders on a second longitudinal side opposite said first longitudinal side, which front bar is movable in a direction transversely to its longitudinal direction between an open position and a closed position, said first connecting means comprising a lace element connected to the screen near a longitudinal edge of the screen and a lace chamber associated with the girder, which lace chamber extends parallel to the longitudinal direction of the girder, in which lace chamber the lace element is retained, which lace chamber has a passage extending parallel to the girder for inserting the lace element into the lace chamber from an end face of the girder, through which passage the screen extends in use, which lace element is strip-shaped.

The present invention further relates to a screen device for use in a greenhouse as described in the foregoing.

The invention further relates to a screen at such for use in a greenhouse according to the invention as described in the foregoing. Within the framework of the preferred embodiments discussed in the foregoing, the screen is preferably characterised in that the screen is provided with a strip-shaped lace element only on two longitudinal sites, which lace element, even more preferably, forms an integral part of the screen, for example because it is knitted or woven into the screen.

The present invention also relates to a method for effecting a connection between the screen and the front bar in a greenhouse as described in the foregoing, comprising the step of inserting the strip-shaped lace element into the lace chamber from an end face of the front bar.

The present invention finally relates to a method for effecting a connection between the screen and the girder in a greenhouse as described in the foregoing, comprising the step of inserting the strip-shaped lace element into the lace chamber from an end face of the girder.

The invention will be explained in more detail hereinafter by means of a description of a number of preferred embodiments of the invention, in which reference is made to the following figures.

Like parts are indicated by corresponding numerals in the figures.

The present invention applies to a greenhouse comprising a frame provided with columns and with parallel, equally spaced girders supported by said columns. The greenhouse further comprises a roof supported by the columns, and a number of circumferential walls. Since such greenhouses are sufficiently known to those skilled in the art, for example because they are described in the patent literature (see for example FIG. 1 of NL 1014244), a detailed description of the above aspects of such a greenhouse is not given herein.

The greenhouse according to the invention is provided with a screen device. The various figures associated with this document relate to parts of such a screen device which inter alia comprises a fabric that can be stretched under the roof of the greenhouse to enable an optimum control of the climate in the greenhouse. The screen device comprises a screen typically having a length of a few dozen or a few hundred metres and a width that approximately corresponds to the spacing between two adjacent girders, so that the open space between the two adjacent girders can be substantially closed by the screen in the closed position of the screen. The screen is thus connected to one of the girders on one longitudinal side and to a front bar on an opposite longitudinal side. The front bar can move forward and backward from one girder to another girder.

FIGS. 1a-15 show a large number of possible embodiments of the way in which the screen is connected either to a front bar or to a girder, whether or not via a so-called chamber section member. All these embodiments have in common the fact that use is made of a somewhat stiff strip-shaped lace element, which is connected to the screen in question near a longitudinal edge thereof. The term "somewhat stiff" as used in this context is understood to mean that the stiffness of the strip-shaped lace element in question is greater than that of the fabric beside the strip-shaped lace element, which aspect does not make it more difficult to roll up the fabric, however.

Figure 1A:
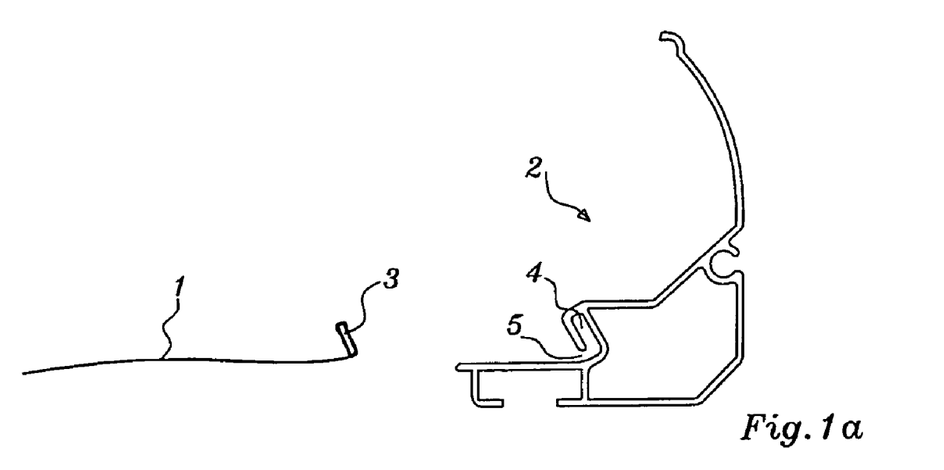
FIGS. 1a and 1b are vertical cross-sectional views of the front bar in combination with the screen in unconnected condition and in connected condition, respectively.
Figure 1B:
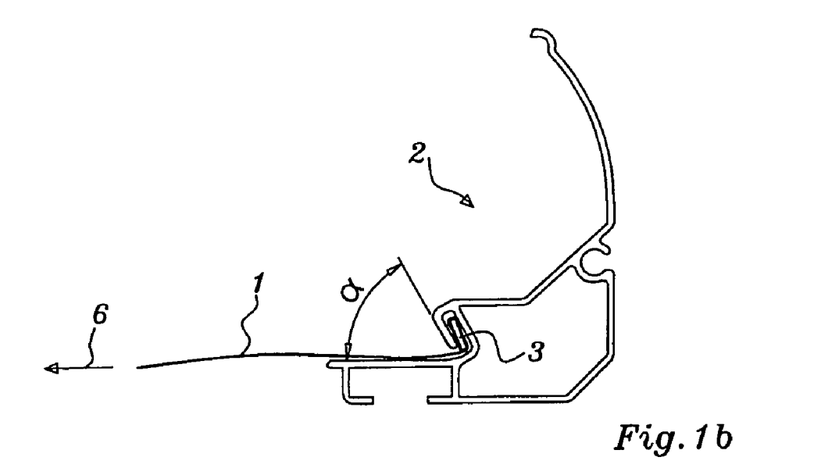

FIGS. 1a and 1b show a flexible screen 1 and a front bar 2 of extruded aluminium. To make it possible to connect the screen 1 to the front bar 2, the screen 1 is provided with a strip-shaped lace element 3 of rectangular cross-section on one longitudinal side thereof. The lace element is integrated with the screen 1 in a manner which will be explained in more detail yet with reference to FIGS. 4 and 6. During the extrusion of the front bar 2, a lace chamber 4 was formed therein. The lace chamber 4 has an at least substantially rectangular cross-section, which is slightly larger than that of the strip-shaped lace element 3. An opening 5 is provided near a corner of the rectangular shape of the cross-section of the lace chamber 4.

To make it possible to connect the screen 1 to the front bar 2, the strip-shaped lace element 3 is inserted into the lace chamber 4 from an end face thereof, with the part of the screen 1 adjacent to the strip-shaped lace element 3 extending through the opening 5. Inserting the lace element 3 of the screen 1 into the lace chamber 4 from an end face of the front bar 2 can for example take place in a very simple manner by making use of a cable attached to an end face of the screen 1, which cable is connected to a winch disposed at the other end face of the front bar 2. By winding the cable onto the winch, the lace element 3 is thus inserted into the lace chamber 4 over the entire length or over the desired length of the front bar 2 from an end face of the front bar 2. In particular in the case of screen lengths of more than 50 m, preferably a few hundred metres, the above-describe procedure for fitting the screen has major advantages, as it is a simple procedure which takes little time. As FIG. 1*b* shows, the strip-shaped lace element 3 and the screen 1 include an angle α of less than 90 degrees, approximately 60 degrees, with each other. In spite of a tensile force being exerted on the screen 1 in the direction of arrow 6, the connection between the screen 1 and the front bar 2 will be maintained because of the form-locked retainment of the strip-shaped lace element 3 in the lace chamber 4, in which regard the aforesaid orientation of the strip-shaped lace element 3 relative to the plane of the screen 1 contributes positively to the quality of the connection in question.

Figure 2A:
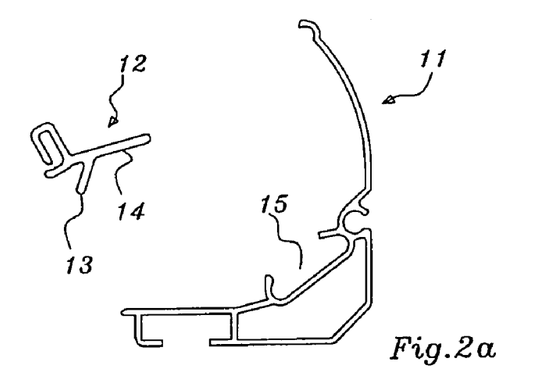
FIGS. 2a-2c are vertical cross-sectional views showing three successive steps of the attachment of a screen to a front bar.
Figure 2B:
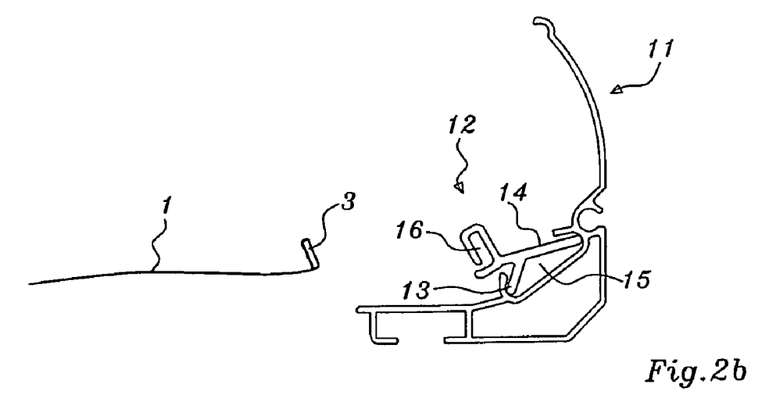
Figure 2C:
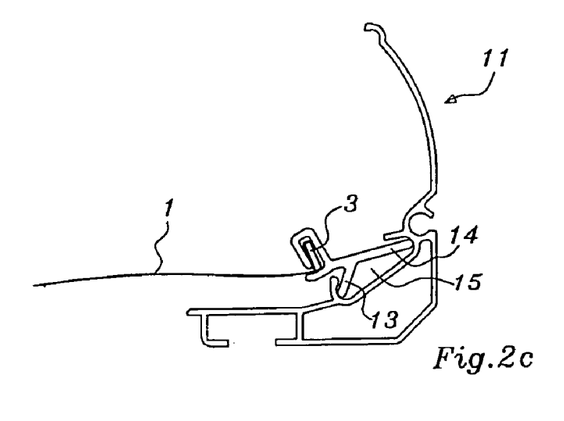

FIGS. 2*a*-2*c* again show a screen 1 with a strip-shaped lace element 3. Furthermore, a front bar 11 of extruded aluminium is provided, which is combined with a chamber section member 12. The chamber section member 12 is an extruded product of a flexible plastic material, so that it can be produced in a great length and be rolled up. In the present example, the length of the chamber section member 12 corresponds to the length of the screen 1, for example 200 m, which is also the length of the greenhouse in which the screen device, of which the screen 1 and the front bar 11 form part, is used. The chamber section member 12 comprises legs 13, 14, which can be snapped into the recesses 15 that form part of the front bar 11. The front bar 11 comprises a number of aligned front bar members, which individually have a typical length of 8 m, for example, and which jointly have a length equal to the length of the screen 1. The chamber section member 12 extends in one piece along all the transitions between the individual front bar members and does not have any transition seams, therefore. The chamber section member 12 has a lace chamber 16, whose shape and orientation correspond to those of the lace chamber 4 shown in FIGS. 1*a* and 1*b*.

The connection between the screen 1 and the front bar 11 is effected by inserting the strip-shaped lace element 3 into the lace chamber 16 along the entire length of the chamber section member 12 from the end face of the front bar, and because of the length of the lace chamber, the screen 1 and the lace element 3 will not encounter any transitions/seams which might lead to wear and an increased resistance. It will be understood that breaking the connection between the screen 1 and the front bar 11 will take place in the reverse manner, viz. by retracting the strip-shaped lace element 3 out of the chamber 16 in the longitudinal direction of the chamber section member 12.

Figure 3A:
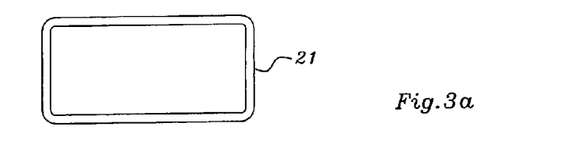
FIGS. 3a-3d show four successive steps of the attachment of a screen to the girder.
Figure 3B:
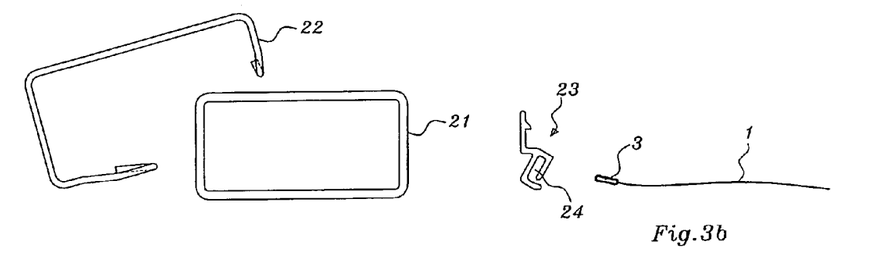
Figure 3C:
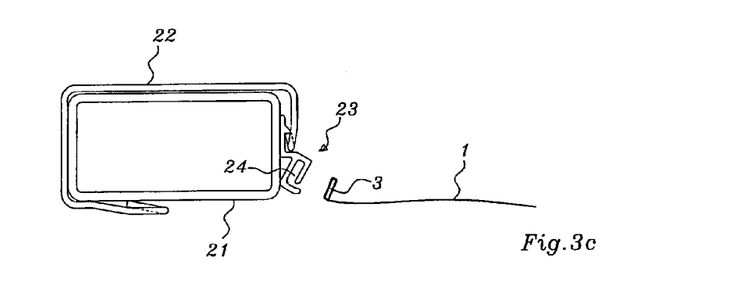
Figure 3D:
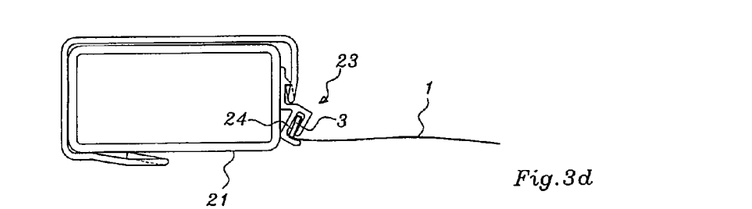

FIGS. 3*a*-3*d* show how a corresponding principle can be used for connecting a screen 1 (also) having a strip-shaped lace element 3 on the other longitudinal side to a girder 21. The girder 21 is made up of a number of aligned steel tubular members, which each have a length of 8 m, for example, and which jointly have a length which corresponds to the length of the greenhouse of which they form part. By means of equally spaced wire clamps 22, a chamber section member 23 of extruded flexible plastic material is connected to the girder 21. The chamber section member 23 comprises a lace chamber 24 having a shape and orientation which corresponds, albeit in mirror image, to that of the lace chamber 4. FIG. 3*d* shows the situation in which the screen 1 is connected to a girder 21 via the chamber section member 23, with the strip-shaped lace element 3 extending within the chamber 24.

Figure 4:
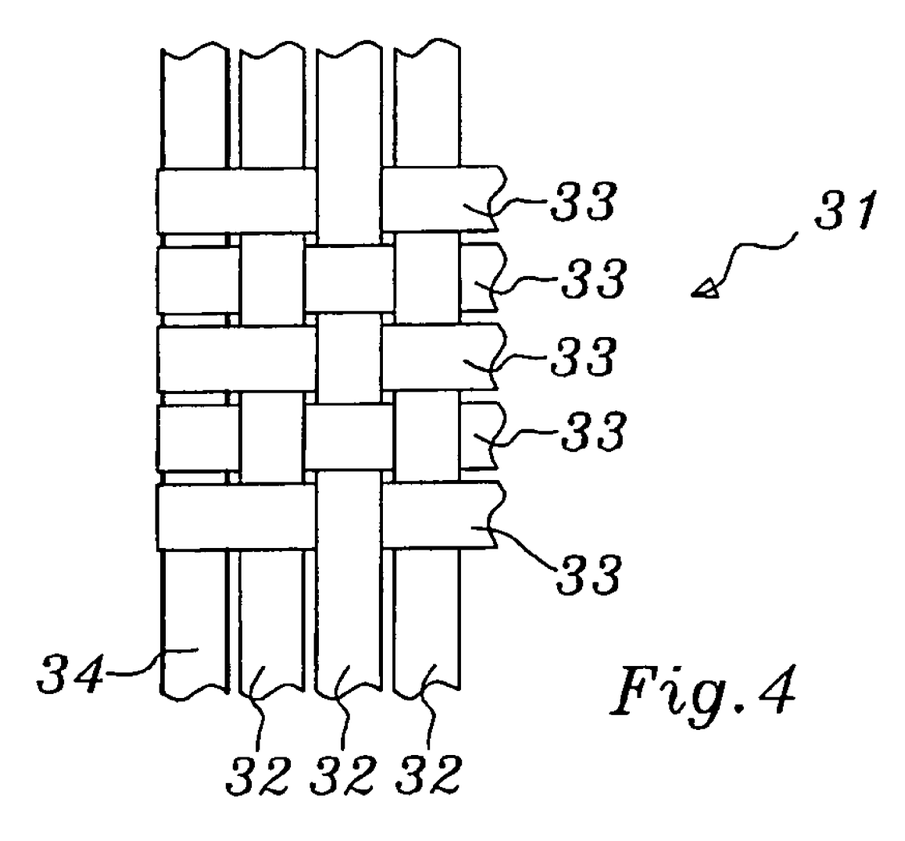
FIG. 4 is a top plan view of a woven screen.

FIG. 4 shows a screen 31 that might be used in the present invention. The screen 31 is of the woven type, the fabric being made up of longitudinal strips 32 extending in the longitudinal direction of the screen 31 and cross strips 33 extending transversely to said longitudinal direction. The longitudinal strips 32 and the cross strips 33 cross according to a fabric pattern and are made of a foil-like material having a very low stiffness. The physical properties of the material of the longitudinal strips 32 and the cross strips 33, as well as the way in which they are woven, determine the functionality of the screen 31 to a significant extent. Thus, the material of the longitudinal strips 32 and the cross strips 33 is selected for its insulation and light transmission properties.

On both longitudinal sides of the screen 31, a longitudinal strip 34 of a different plastic material having a different thickness is provided. As a result, said longitudinal strip 34 has a significantly higher stiffness than the longitudinal strips 32 and the cross strips 33, at least relatively so. Said stiffness does not interfere with the rolling up of the screen 31 in the longitudinal direction, however, whilst the relatively flat shape of the longitudinal strip 34, which forms a strip-shaped lace element for the screen 31, like the strip-shaped lace element 3 in the above-discussed embodiments, prevents undesirably high tensions being set up in the screen 31 upon rolling up the screen 31, even if the screen has a length of for example 200 m, which might lead to damage to the screen 31.

Figure 5A:
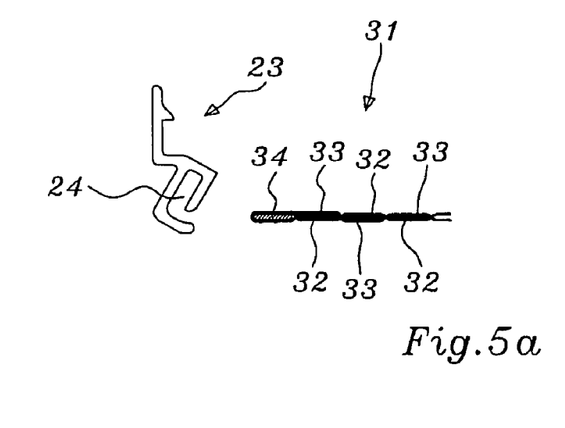
FIGS. 5a-5c are more detailed vertical cross-sectional views of a part of FIGS. 3b-3d used with a screen as shown in FIG. 4.
Figure 5B:
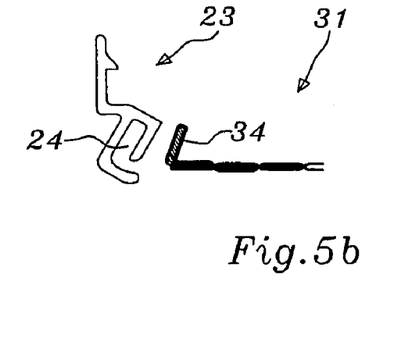
Figure 5C:
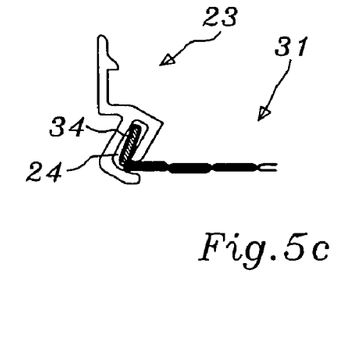

FIGS. 5*a*-5*c* show in vertical cross-section how the screen 31 can be connected in successive steps to the chamber section member 23 and thus, via said chamber section member 23, to a girder 21 (see also FIGS. 3*a*-3*d*). The reader will appreciate that it is also possible to realise a connection of this kind with a front bar.

Figure 6:
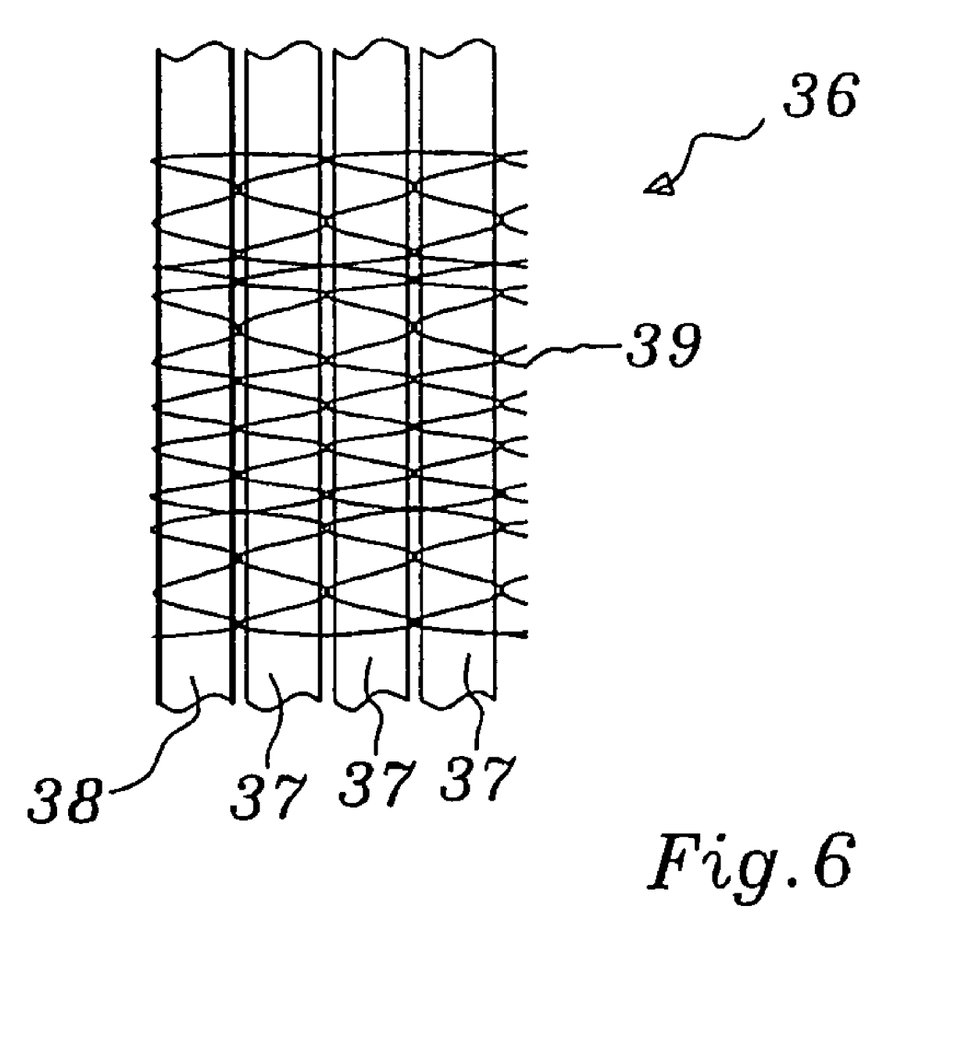
FIG. 6 is a top plan view of a knitted screen.

FIG. 6 shows an alternative screen 36, which can be considered to be a knit. The screen 36 comprises strips 37, which extend parallel to each other in longitudinal direction. On the longitudinal sides (or at least on one longitudinal side) thereof, the screen 36 is provided with a longitudinal strip 38 having an increased stiffness, partially as a result of having a greater thickness, in comparison with the stiffness of the longitudinal strips 37, which are made of a flexible, foil-like material, just like the longitudinal strips 32 and the cross strips 33 of the screen 31 in FIG. 4. The correct arrangement relative to each other of the longitudinal strips 37 and the longitudinal strip 38, which forms a strip-shaped lace element, like the lace element 3 in FIGS. 1*a*-3*d*, is maintained by a knitting yarn 39.

Figure 7A:
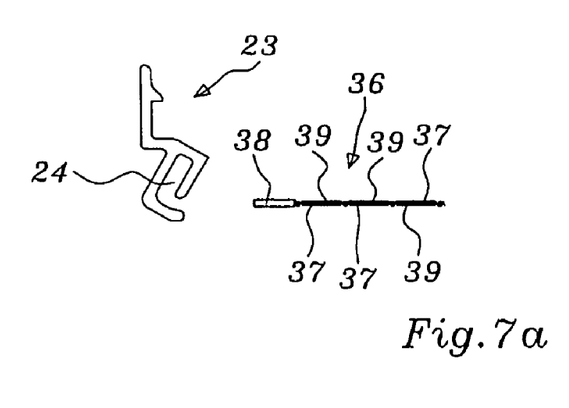
FIGS. 7a-7c are more detailed vertical cross-sectional views of a part of FIGS. 3b-3d used with a screen as shown in FIG. 6.
Figure 7B:
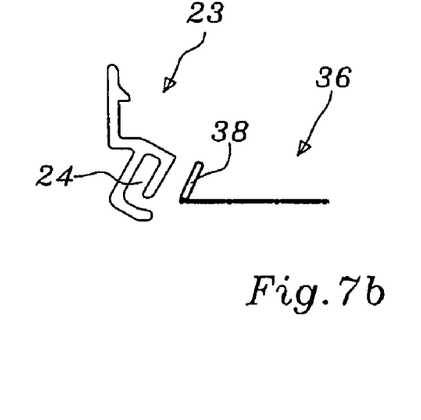
Figure 7C:
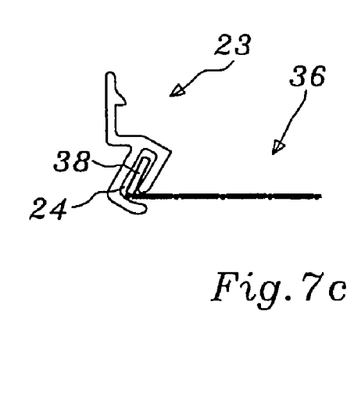

FIGS. 7*a*-7*c* show how the screen 36 can be connected to a chamber section member 23. The method shown fully corresponds to the method according to FIGS. 5*a*-5*c*.

Figure 8A:
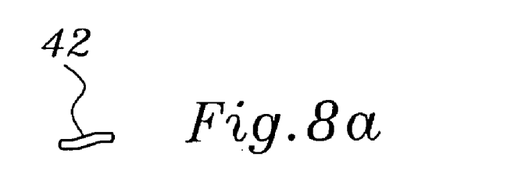
FIGS. 8a-8c are vertical sectional views of a strip having a z-shaped cross-section, the strip shown in FIG. 8a integrated in a screen, and the screen shown in FIG. 8b connected to a chamber section member, respectively.
Figure 8B:
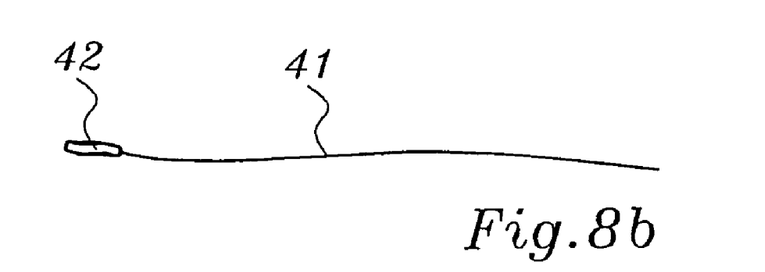
Figure 8C:
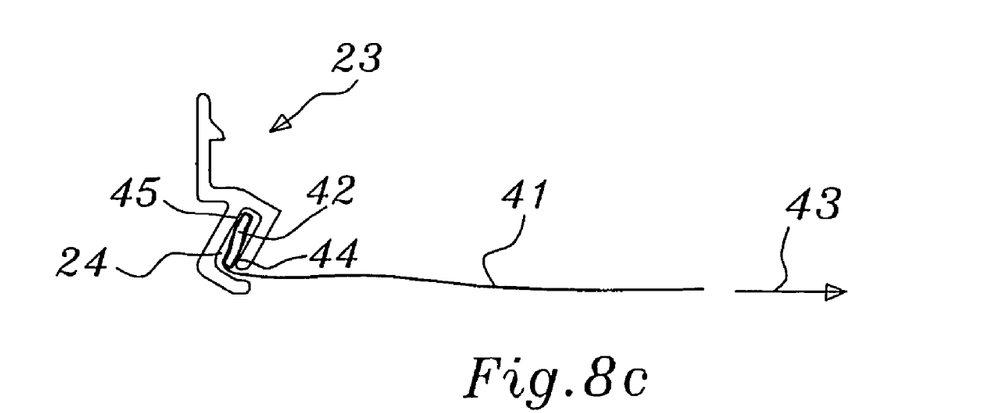

FIGS. 8*a*-8*c* relate to a screen 41 combined with the chamber section member 23. On the illustrated longitudinal side of the screen 41, the screen 41 is provided with an integrated lace element 42. Seen in cross-sectional view, the strip-shaped lace element 42 has a twice-folded form, so that the cross-section is more or less Z-shaped. This provides the advantage that when tension is exerted on the screen 41 in the direction of arrow 43, the strip-shaped lace element 42 will abut against the inner side of the lace chamber 24 with its surfaces 44, 45, which leads to an improved distribution of the pressure on the strip-shaped lace element 42.

Figure 9A:
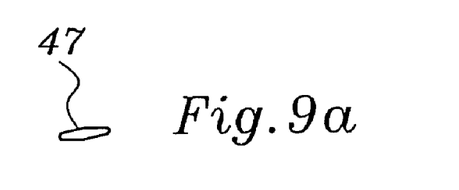
FIGS. 9a-9c are vertical sectional views of a strip having a diamond-shaped cross-section, the strip shown in FIG. 9a integrated in a screen, and the screen shown in FIG. 9b connected to a chamber section member, respectively.
Figure 9B:
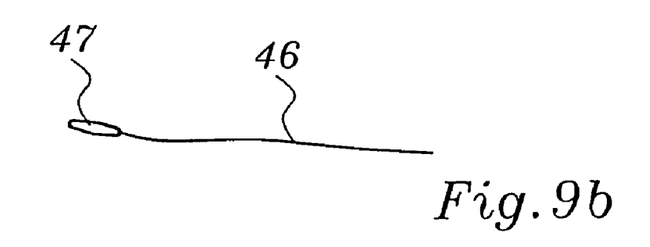
Figure 9C:
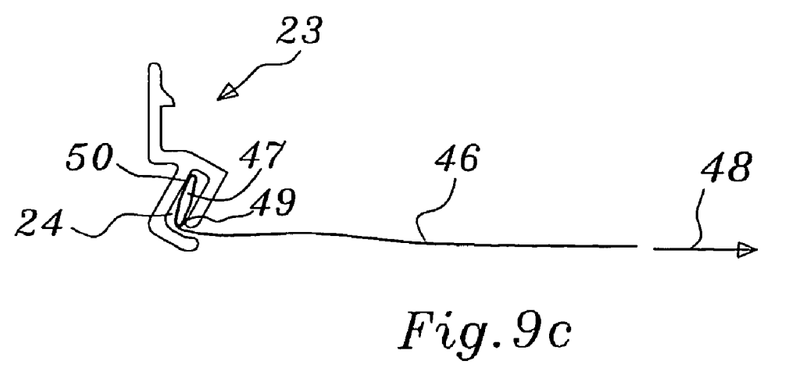

The same advantage applies to the screen 46, which is configured with a strip-shaped lace element 47, which has an at least substantially diamond-shaped cross-section. When a tensile force is exerted on the screen 46 in the direction of arrow 48, this will result in a flat abutment of the strip-shaped lace element 47 at the location of the surfaces 49, 50.

Figure 10A:
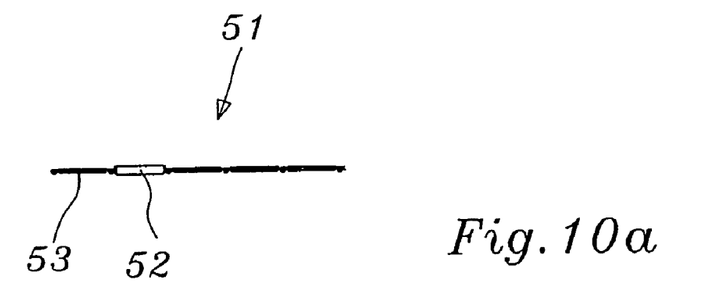
FIGS. 10a-10d show four successive steps of the attachment of a screen to a chamber section member.
Figure 10B:
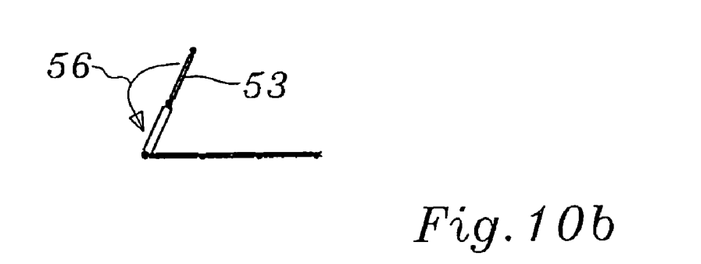
Figure 10C:
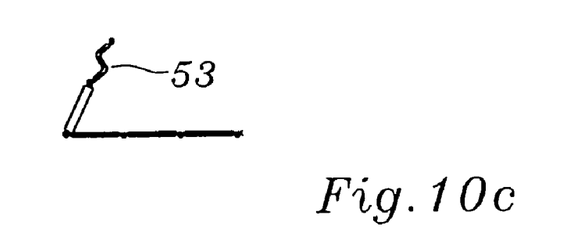
Figure 10D:
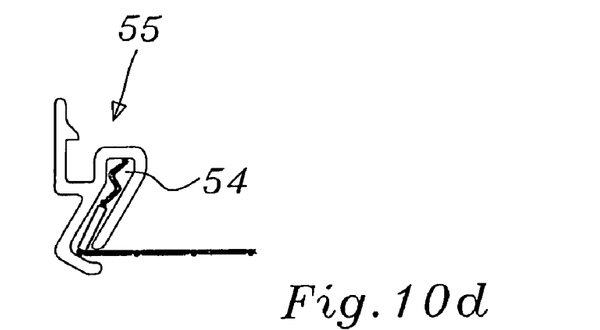

FIGS. 10*a*-10*d* show a screen 51 where the strip-shaped lace element 52 is not located entirely on a longitudinal side of the screen 51, as is the case in the previously discussed screens 1, 31, 36, 41 and 46, but where the lace element 52 is located beside an outermost longitudinal strip 53. To accommodate the outermost longitudinal strip 53, a lace chamber 54 of increased height is provided in the chamber section member 55, whilst the longitudinal strip 53, precisely because of its foil-like nature, can be slightly deformed, as is shown in FIG. 10d. Alternatively it is also conceivable to fold the outermost longitudinal strip 53 through 180 degrees, in the direction of arrow 56, against the strip-shaped lace element, from the situation shown in FIG. 10b, so that the lace chamber 54 need not be extra high, whilst it would at most be necessary to increase the width of the lace chamber 54 to a very limited extent.

Figure 11:
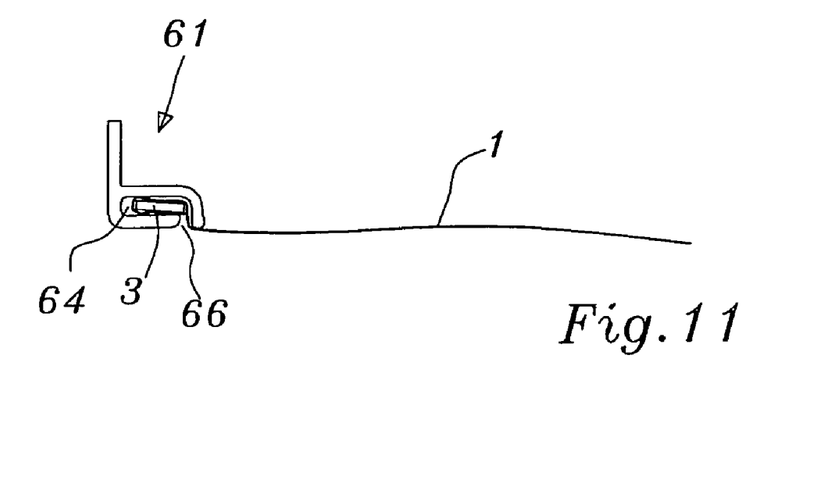
FIGS. 11-15 are vertical cross-sectional views of five combinations of a screen with a chamber section member.
Figure 12:
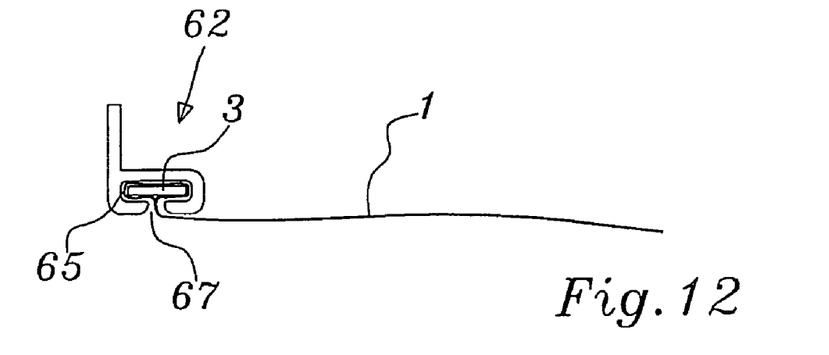
Figure 13:
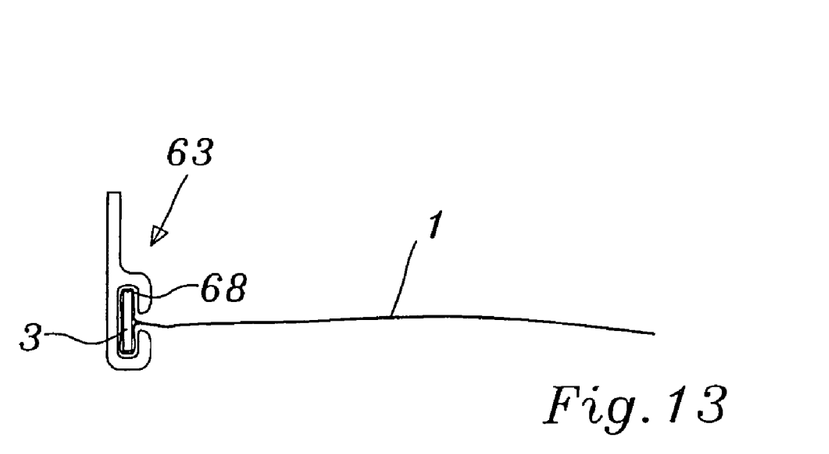

FIGS. 11-13 show alternative embodiments of chamber section members 61, 62 and 63, respectively, which may be used in combination with a screen 1 provided with the strip-shaped lace element 3 of rectangular cross-section. The chamber section members 61, 62, 63 are provided with means (not shown) for being connected either to a girder or to a front bar. Such means may for example consist of means for effecting a snap connection with the girder or front bar in question. The chamber section members 61 and 62 have a lace chamber 64, 65, respectively, which is oriented so that the strip-shaped lace element 3 that extends within the lace chamber 64, 65 in question extends parallel to the screen 1. The lace chambers 64, 65 are different from each other in that the opening 66 of the lace chamber 64 is located near the corner of the lace chamber 64, whereas the opening 67 of the lace chamber 65 extends in the centre of the length of the bottom side of the lace chamber 65. This makes it necessary to turn the lace element through 90° within the screen 1, so that the strip-shaped lace element 3 in fact extends transversely to the screen 1.

The same applies to the chamber section member 63 in FIG. 13, which is provided with a vertically oriented lace chamber 68. This makes it possible to design the chamber section member 63 to be very narrow, which may be advantageous in connection with a desired light output.

Figure 14:
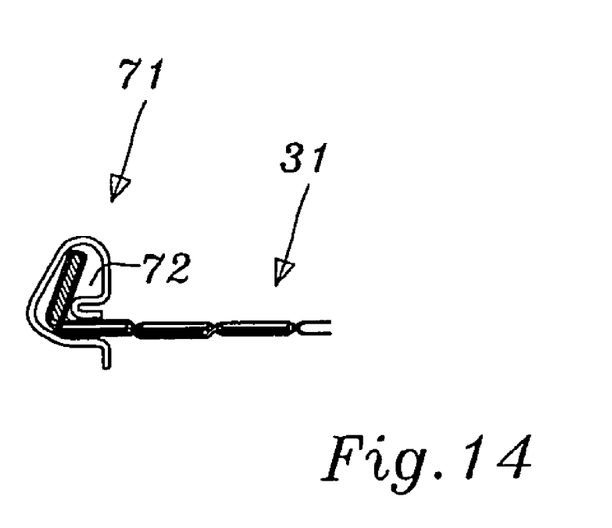

FIG. 14 shows a screen 31 in combination with a chamber section member 71. In contrast to the chamber section members 12, 23, 55, 61, 62 and 63 that have been discussed so far, the chamber section member 71 is neither made of plastic material nor is it an extruded product. Instead, the chamber section member 71 is a rolled part made of steel, such as spring steel. Said rolling of the chamber section member 71 may take place in the greenhouse in which the chamber section member 71 is used, so that the length of the chamber section member 71 can be selected to be the same as the length of the greenhouse. Using fasteners (not shown), which may comprise wire clamps, such as the wire clamps 22 in FIG. 3b, or spring clamps made of strip steel, the chamber section member 71 can be connected to a girder or to a front bar. A distinct further difference between the chamber section member 71 and the chamber section members discussed so far is that the shape of the lace chamber 72 therein is not rectangular.

Figure 15:
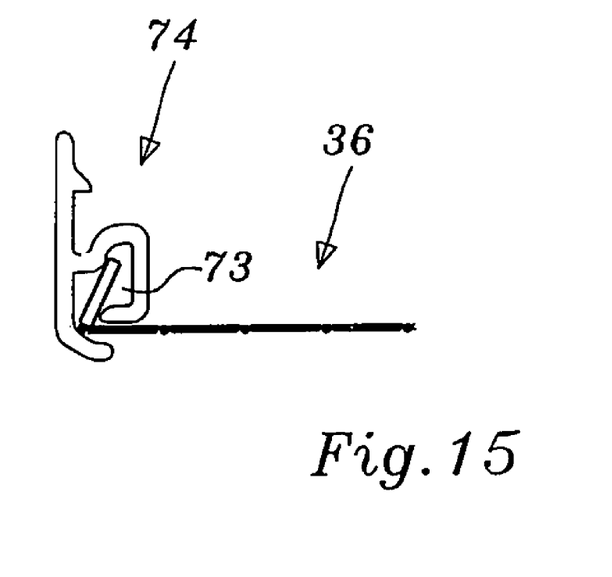

The latter also applies with regard to the shape of the lace chamber 73 that forms part of the chamber section member 74 of extruded plastic material combined with the screen 36 in FIG. 15.

The dimensions of the strip-shaped lace element 3, 34, 38, 42, 47 and 52 have not been discussed in detail in the foregoing. Within the framework of the present invention, a typical dimension might be a (maximum) thickness of the lace element of 1 mm and a width of 6 mm. The height of the opening, such as the opening 5 in FIG. 1a, may for example be 1.5 mm in that case.

Although the invention has been explained in the foregoing by means of a number of examples in which the screening question is used as a horizontal screen, the same principles may also be used with vertical screens and/or with roll-up screens extending along the sloping roof of the greenhouse on the inside or on the outside of the greenhouse, as those skilled in the art will realise. In the latter situations, the front bar is (fitted with) a drum element, onto which the screen can be rolled.

The invention claimed is:

1. A greenhouse comprising a frame provided with columns and with parallel, equally spaced girders supported by said columns, as well as a roof supported by said columns and with at least one wall, said greenhouse comprising a screen device along the roof and/or along a wall, which screen device comprises at least one screen which is connected, via first connecting means, to a girder on a first longitudinal side, and which is connected, via second connecting means, to a front bar extending parallel to the girders on a second longitudinal side opposite said first longitudinal side, which front bar is movable in a direction transversely to its longitudinal direction between an open position and a closed position, said second connecting means comprising a lace element connected to the screen near a longitudinal edge of the screen and a lace chamber associated with the front bar, which lace chamber extends parallel to the longitudinal direction of the front bar, in which lace chamber the lace element is retained, which lace chamber has a passage extending parallel to the front bar for inserting the lace element into the lace chamber from an end face of the front bar, through which passage the screen extends in use, wherein said lace element is strip-shaped.

2. A greenhouse according to claim 1, wherein said lace chamber has an at least substantially rectangular cross-section.

3. A greenhouse according to claim 1, wherein the transverse direction of the strip-shaped lace element includes an angle with the part of the screen that joins the lace element in the closed position of the front bar.

4. A greenhouse according to claim 3, wherein said angle is smaller than or equal to 90 degrees.

5. A greenhouse according to claim 4, wherein said angle ranges between 30 and 70 degrees.

6. A greenhouse according to claim 1, wherein the strip-shaped lace element and the lace chamber have at least one flat or at any rate flattened longitudinal side.

7. A greenhouse according to claim 1, wherein the lace chamber has at least one flat or at any rate flattened longitudinal side.

8. A greenhouse according to claim 1, wherein the strip-shaped lace element has an at least substantially diamond-shaped or Z-shaped cross-section.

9. A greenhouse according to claim 1, wherein said passage is located in or at least near a corner of the cross-section of the lace chamber.

10. A greenhouse according to claim 1, wherein the lace chamber forms part of an extruded first chamber section member made of plastic material.

11. A greenhouse according to claim 10, wherein the first chamber section member is connected to the front bar via first further connecting means, preferably of the snap-type.

12. A greenhouse according to claim 10, wherein the front bar is built up of a number of interconnected front bar parts positioned in line with each other, wherein the first chamber section member is made in one piece and the length of the first chamber section member is greater than the length of the individual front bar parts.

13. A greenhouse according to claim 1, wherein the lace chamber forms part of a rolled first chamber section member made of a metal.

14. A greenhouse according to claim 1, wherein the strip-shaped lace element forms an integral part of the screen.

15. A greenhouse according to claim 14, wherein the strip-shaped lace element is woven or knitted into the screen.

16. A greenhouse according to claim 1, wherein the screen comprises parallel, flexible foil parts extending in the longitudinal direction of the screen, the width of which foil parts is at least substantially the same as the width of the strip-shaped lace element.

17. A greenhouse according to claim 1, wherein the screen comprises parallel, flexible foil parts extending in the longitudinal direction of the screen, the width of which foil parts is smaller than the width of the strip-shaped lace element.

18. A greenhouse according to claim 1, wherein the proportion between the width and the thickness of the strip shape of the strip-shaped lace element is minimally three, preferably minimally five.

19. A greenhouse according to claim 1, wherein the width of the strip shape of the strip-shaped lace element is at least 3 mm.

20. A greenhouse according to claim 1, wherein said first connecting means comprise a further strip-shaped lace element which is connected to the screen near a longitudinal edge of the screen, as well as a further lace chamber associated with the girder, which extends parallel to the longitudinal direction of the girder, in which further lace chamber said further strip-shaped lace element is retained, which further lace chamber has a further passage extending parallel to said girder for inserting said further strip-shaped lace element into said further lace chamber from an end face of the girder, through which further passage the screen extends in use.

21. A greenhouse according to claim 20, wherein said strip-shaped lace element and said further strip-shaped lace element are identical in shape.

22. A screen device for use with a greenhouse, the greenhouse comprising a frame provided with columns and with parallel, equally spaced girders supported by said columns, as well as a roof supported by said columns and with at least one wall, wherein said screen device is along the roof and/or along a wall, said screen device comprising:
    at least one screen which is connected, via first connecting means, to a girder on a first longitudinal side, and which is connected, via second connecting means, to a front bar extending parallel to the girders on a second longitudinal side opposite said first longitudinal side, which front bar is movable in a direction transversely to its longitudinal direction between an open position and a closed position, said second connecting means comprising a lace element connected to the screen near a longitudinal edge of the screen and a lace chamber associated with the front bar, which lace chamber extends parallel to the longitudinal direction of the front bar, in which lace chamber the lace element is retained, which lace chamber has a passage extending parallel to the front bar for inserting the lace element into the lace chamber from an end face of the front bar, through which passage the screen extends in use, wherein said lace element is strip-shaped.

23. A screen for use with a greenhouse, the greenhouse comprising a frame provided with columns and with parallel, equally spaced girders supported by said columns, as well as a roof supported by said columns and with at least one wall, said greenhouse comprising a screen device along the roof and/or along a wall, which screen device comprises at least one screen which is connected, via first connecting means, to a girder on a first longitudinal side, and which is connected, via second connecting means, to a front bar extending parallel to the girders on a second longitudinal side opposite said first longitudinal side, which front bar is movable in a direction transversely to its longitudinal direction between an open position and a closed position, said second connecting means comprising a lace element connected to the screen near a longitudinal edge of the screen and a lace chamber associated with the front bar, which lace chamber extends parallel to the longitudinal direction of the front bar, in which lace chamber the lace element is retained, which lace chamber has a passage extending parallel to the front bar for inserting the lace element into the lace chamber from an end face of the front bar, through which passage the screen extends in use, wherein said lace element is strip-shaped.

24. A screen according to claim 23, wherein the screen is provided with a strip-shaped lace element only on two longitudinal sites.

25. A screen according to claim 23, wherein the strip-shaped element forms an integral part of the screen.

26. A method for effecting a connection between the screen and the front bar in a greenhouse, wherein the greenhouse comprises a frame provided with columns and with parallel, equally spaced girders supported by said columns, as well as a roof supported by said columns and with at least one wall, said greenhouse further comprising a screen device along the roof and/or along a wall, which screen device comprises at least one screen which is connected, via first connecting means, to a girder on a first longitudinal side, and which is connected, via second connecting means, to a front bar extending parallel to the girders on a second longitudinal side opposite said first longitudinal side, which front bar is movable in a direction transversely to its longitudinal direction between an open position and a closed position, said second connecting means comprising a lace element connected to the screen near a longitudinal edge of the screen and a lace chamber associated with the front bar, which lace chamber extends parallel to the longitudinal direction of the front bar, in which lace chamber the lace element is retained, which lace chamber has a passage extending parallel to the front bar for inserting the lace element into the lace chamber from an end face of the front bar, through which passage the screen extends in use, wherein said lace element is strip-shaped, said method comprising:
    inserting the strip-shaped lace element into the lace chamber from an end face of the front bar.

* * * * *